No. 872,922. PATENTED DEC. 3, 1907.
F. W. FLEMING.
ECCENTRIC.
APPLICATION FILED APR. 2, 1907.
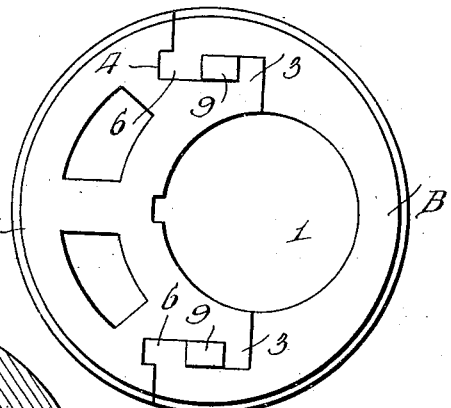
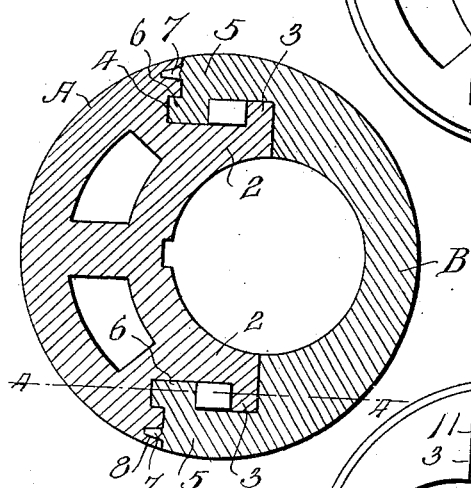
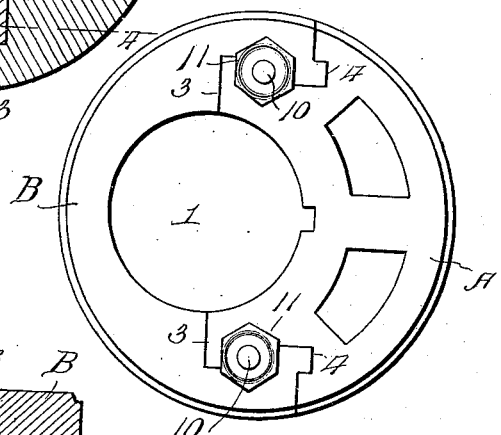
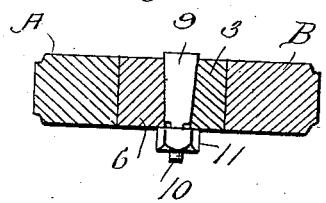
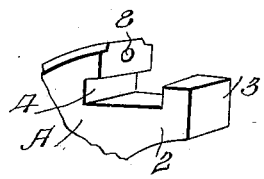
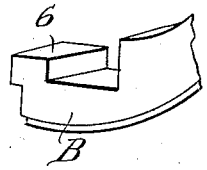
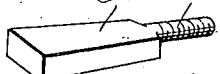
Inventor
Forney W. Fleming,
Witnesses
Frank Hough
Wm Bagger
By Victor J. Evans
Attorney

UNITED STATES PATENT OFFICE.

FORNEY W. FLEMING, OF ARCHER, FLORIDA, ASSIGNOR OF ONE-HALF TO SAMUEL K. FLEMING, OF MONTGOMERY, ALABAMA.

ECCENTRIC.

No. 872,922.      Specification of Letters Patent.      Patented Dec. 3, 1907.

Application filed April 2, 1907. Serial No. 365,991.

*To all whom it may concern:*

Be it known that I, FORNEY W. FLEMING, a citizen of the United States, residing at Archer, in the county of Alachua and State of Florida, have invented new and useful Improvements in Eccentrics, of which the following is a specification.

This invention relates to split eccentrics; that is to say, eccentrics which are made in two halves in order to facilitate the placing of the same upon the shaft.

The invention, which is likewise applicable to pulleys, collars and the like has for its object to simplify and improve the construction of this class of devices and to insure the proper securement of the eccentric or other member upon the shaft.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however, understood that no limitation is necessarily made to the precise structural details therein exhibited, but that changes, alterations and modifications within the scope of the invention may be resorted to when desired.

In the drawing, Figures 1 and 2 are side views showing the opposite sides of an eccentric constructed in accordance with the invention. Fig. 3 is a vertical sectional view of the same, taken at right angles to the axis. Fig. 4 is a sectional view taken on the plane indicated by the line 4—4 in Fig. 3. Figs. 5 and 6 are perspective detail views showing opposite ends of the two members or halves of the device. Fig. 7 is a perspective detail view of one of the connecting bolts or wedges.

Corresponding parts in the several figures are denoted by like characters of reference.

The improved eccentric is divided, diametrically of the shaft opening or aperture 1 into two parts or members A and B. The ends of the part or section A are provided adjacent to the shaft aperture with lugs 2—2 having terminal outward projecting flanges 3—3; undercut grooves or recesses 4—4 are formed in the walls or shoulders at the inner ends of the lugs 2.

The part or section B is provided at the ends thereof adjacent to the perimeter of the device with lugs 5—5 having terminal inward projecting overhanging flanges 6—6, the overhanging portions of which are adapted for engagement with the undercut recesses 4 in the part or section A; the end walls of the lugs 5 are provided with outward projecting spurs 7 adapted for engagement with recesses 8 in the walls of the part or section A adjacent to the undercut recesses 4.

The inner or proximate walls of the flanges 3 and 6, when the parts or sections A and B are placed together in operative relation, are spaced apart, and said walls are beveled so that they will converge in the direction of one side of the eccentric for the insertion of the wedge shaped head 9 of a bolt 10 which, by pressing against the converging side walls of the flanges 3 and 6 will force said flanges apart from each other, thus forcing the parts or sections A and B of the eccentric together in such a manner as to grip the shaft extending through the aperture 1, and upon which the parts of the device have been adjusted. The wedge may be drawn as tight as may be desired by means of nuts 11 upon the threaded shank or bolt portion of said wedge.

The operation and advantages of this invention will be readily understood from the foregoing description taken in connection with the drawings hereto annexed. When the wedges are removed, the parts or sections A and B may be readily detached from the shaft upon which they are mounted by first pulling them slightly apart until the spurs 7 become disengaged from the recesses 8, and then sliding the said sections apart by moving them in opposite directions on lines approximately parallel to the axis. In replacing the parts upon a shaft, the spurs 7 engaging the recesses 8 will insure proper alinement of the parts, and a very secure connection will be afforded by the overhanging portions of the flanges 6 of the section B engaging the undercut grooves 4 in the section A; by inserting the wedges 9 between the flanges 3 and 6 of the lugs 2 and 5, and properly tightening said wedges, the sections A and B will be caused to grip the shaft very securely.

Having thus fully described the invention, what I claim as new is:—

A device of the class described comprising parts or sections having a shaft engaging aperture, one of said sections being provided adjacent to the shaft engaging aperture with lugs having terminal outward projecting flanges and undercut grooves in the walls at the inner ends of said lugs, and the other section being provided with perimetral lugs having inward projecting terminal overhanging flanges, and one of said sections being provided with spurs engaging recesses in the other section; in combination with tightening wedges adjustable between the flanges of the two sections.

In testimony whereof, I affix my signature in presence of two witnesses.

FORNEY W. FLEMING.

Witnesses:
J. E. WELLS,
C. W. BANKNIGHT.